(12) United States Patent
Nakamichi

(10) Patent No.: US 6,781,940 B2
(45) Date of Patent: Aug. 24, 2004

(54) DISK CONVEYING MECHANISM

(75) Inventor: Niro Nakamichi, Tokyo (JP)

(73) Assignees: Mechanical Research Corporation, Tokyo (JP); Alpine Electronics, Inc., Tokyo (JP)

( * ) Notice: Subject to any disclaimer, the term of this patent is extended or adjusted under 35 U.S.C. 154(b) by 15 days.

(21) Appl. No.: 10/176,798

(22) Filed: Jun. 21, 2002

(65) Prior Publication Data

US 2003/0021196 A1 Jan. 30, 2003

Related U.S. Application Data

(62) Division of application No. 09/535,299, filed on Mar. 24, 2000, now Pat. No. 6,633,517.

(30) Foreign Application Priority Data

Sep. 2, 1999 (JP) .......................................... 11-248392

(51) Int. Cl.[7] .............................................. G11B 33/02
(52) U.S. Cl. ...................................................... 369/77.1
(58) Field of Search ............................ 369/30.82, 77.1, 369/75.2

(56) References Cited

U.S. PATENT DOCUMENTS

| | | | | |
|---|---|---|---|---|
| 5,561,657 A | * | 10/1996 | Ogawa ........................ | 369/179 |
| 5,583,717 A | * | 12/1996 | Nakata et al. ........... | 360/99.06 |
| 5,594,710 A | * | 1/1997 | Nakamichi ............... | 369/30.78 |
| 5,737,285 A | * | 4/1998 | Uchiyama ................ | 369/30.32 |
| 5,862,109 A | * | 1/1999 | Nakamichi ............... | 360/98.04 |
| 6,388,983 B1 | * | 5/2002 | Kikuchi ..................... | 369/270 |
| 6,392,981 B2 | * | 5/2002 | Watanabe et al. ........... | 369/192 |
| 6,396,796 B1 | * | 5/2002 | Kletzl ........................ | 250/200 |

FOREIGN PATENT DOCUMENTS

EP          0 833 324        * 1/1998

* cited by examiner

Primary Examiner—David Davis
(74) Attorney, Agent, or Firm—Darby & Darby

(57) ABSTRACT

A connecting member connects a pair of holder plates toward the end of the holder plates at the recessed end in the direction in which the disk is inserted. By forming the holding member holding disks using three pieces, there is less deformation causes by high temperatures compared to integrally formed units. Also, since this connecting member only serves to connect the pair of holder plates, a thin rod-shaped connecting bar can be used. This allows the clearance between the disks held toward the back of the device and the rear panel to be minimized, thus contributing to a reduced depth dimension for the device.

2 Claims, 17 Drawing Sheets

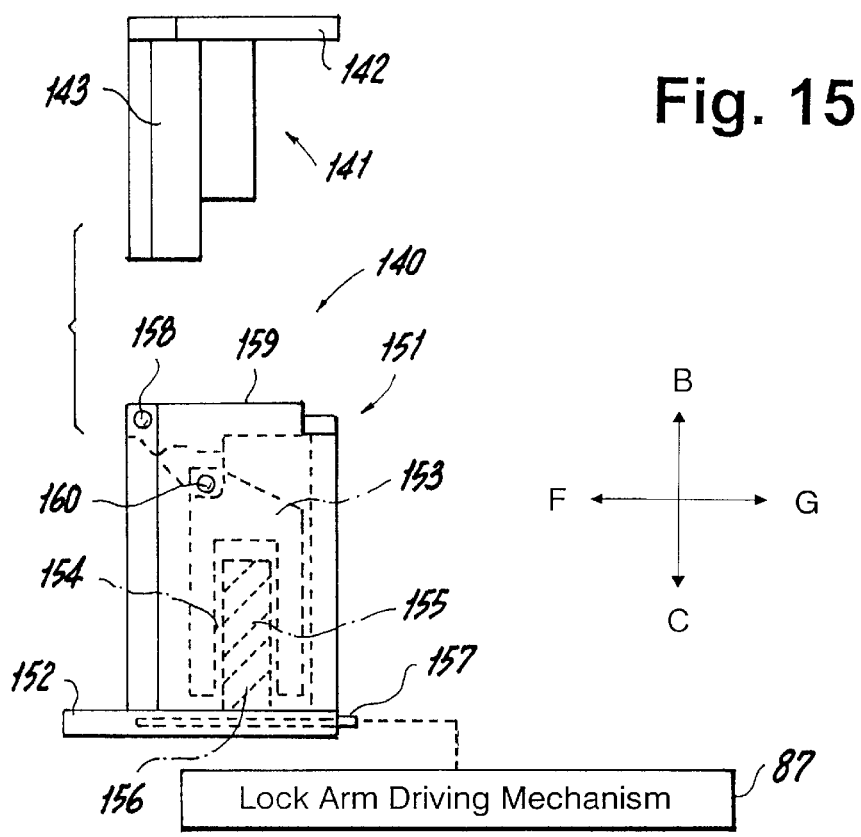
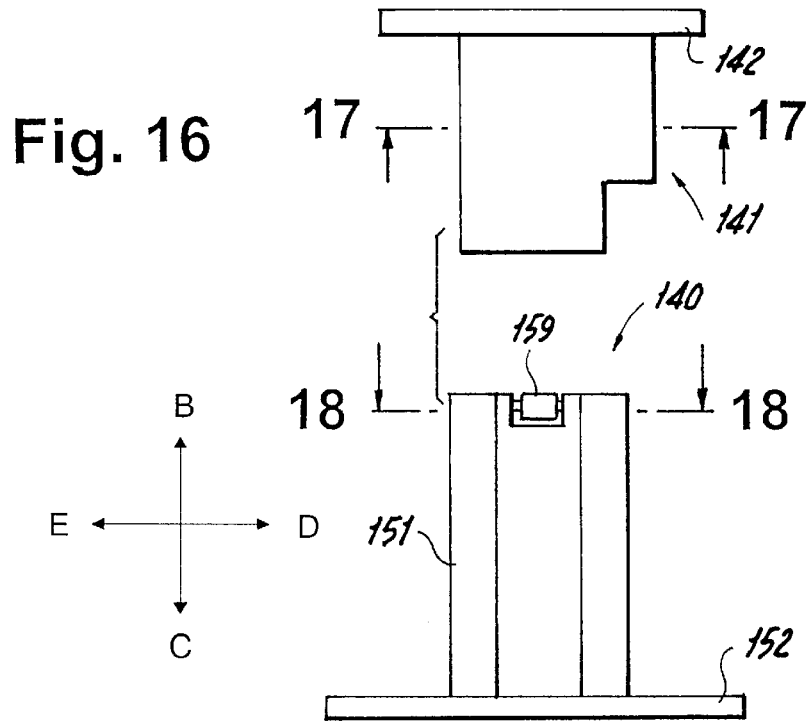

DISK CONVEYING MECHANISM

This application is a Division of Application Ser. No. 09/535,299 filed Mar. 24, 2000 now U.S. Pat. No. 6,633,517.

BACKGROUND OF THE INVENTION

The present invention relates to a disk playback device. More specifically, the present invention relates to a disk playback device wherein the depth dimension of the device is reduced.

There has been a greater demand for disk playback devices with smaller depth dimensions, especially for automotive in-dash disk changers attached to a dashboard of an automobile. Therefore, there clearly is a need to reduce the depth dimension of devices by allowing a disk being played back to overlap, when viewed from above, with disks in a storage position. In addition, the depth dimension should be further reduced by reassessing the shapes and structures of individual parts.

Conventional devices have an internal layout where a storing member, which holds disks by supporting the edges of disks, is disposed at the very back of the device. The depth dimension of the device can then be reduced by positioning the rear panel of the device as close as possible to the rearmost section of the disks held in the storing member.

In this case, the storing member must support the disk edges over an appropriate angular range. Thus, the storing member is interposed between the rearmost section of the disks stored in the storing member and the rear panel. The width of the storing member at its rearmost section must be reduced as much as possible.

OBJECTS AND SUMMARY OF THE INVENTION

It is an object of the present invention to provide a disk playback device which overcomes the foregoing problems.

It is another object of the present invention to provide a disk playback device wherein the overall depth dimension is significantly reduced.

Briefly stated, the present invention provides a connecting member connecting a pair of holder plates toward the end of the holder plates at the recessed end in the direction in which the disk is inserted. By forming the holding member holding disks using three pieces, there is less deformation causes by high temperatures compared to integrally formed units. Also, since this connecting member only serves to connect the pair of holder plates, a thin rod-shaped connecting bar can be used. This allows the clearance between the disks held toward the back of the device and the rear panel to be minimized, thus contributing to a reduced depth dimension for the device.

According to an embodiment of the present invention, there is provided a disk playback device equipped with a disk holding device comprising first and second holder plates for supporting a disk edge along an appropriate angular range, a connecting member connecting the first and second holder plates at far ends of a direction of disk insertion, and conveying means engaging with each of the first and second holder plates, thereby allowing the first and second holder plates to move perpendicular to a recording surface of the disk and parallel to each other.

According to another embodiment of the present invention there is provided a disk playback device equipped with a disk holding device comprising a plurality of drive pulleys conveying the disk between a disk insertion/removal position and a disk playback position by engaging with an edge of the disk, at least two of the plurality engaging with the edge of the disk when the disk is brought to the disk playback position, guiding means supporting the disk between the guiding means and the plurality of drive pulleys, and pulley/guide driving means moving the plurality of drive pulleys and the guiding means close to and away from each other.

According to a further embodiment of the present invention, there is provided a disk playback device comprising conveying means, for conveying a disk between an insertion/removal position and a playback position by supporting an edge of the disk from either side, the conveying means being movable away from the disk when the disk is being played back, a turntable rotating the disk, a clamper clamping the disk to the turntable, a clamp arm extending roughly perpendicular to the disk conveyance direction rotatably supporting the clamper, the clamp arm having a bend, whereby when the conveying means is moved away from the disk, at least a section of the clamp arm overlapping with the disk conveying means is separated by a greater distance than other sections of the clamp arm.

According to a feature of the present invention, there is provided a disk playback device, holding a plurality of disks and conveying a selected disk from a holding position to a playback position to play back the selected disk, comprising first and second locking members passing through center holes of the plurality of disks positioned at the holding position, a lock arm pivotably supported by one of the first and second of locking members, and the lock arm pivoting to close a gap formed between the first and second locking members.

According to another feature of the present invention, there is provided a disk playback device comprising first and second conveying means for conveying recording media supporting a recording medium from either side, the first and second conveying means conveying the recording medium inserted from a recording media insertion opening to a predetermined position, a driving mechanism, driving at least one of the first and second conveying means so that the first and second conveying means move close to and away from each other, detecting means for detecting a gap between the first and second conveying means is increased due to insertion of the recording medium between the first and second conveying means, and controlling means for controlling the driving mechanism to drive the first and second conveying means in response to the detecting means, whereby the first and second conveying means move to increase a gap between the first and second conveying means.

According to a further feature of the present invention, there is provided a disk playback device comprising a plurality of drive rollers abutting a recording medium inserted from a recording media insertion opening, the plurality conveying the recording medium to a predetermined position, driving means for rotating the plurality, supporting means for movably supporting a single drive roller, belonging to said plurality of drive rollers, disposed toward the recording media insertion opening, relative to the remainder of the plurality of drive rollers, and detecting means for detecting a movement of the single drive roller toward the recording media insertion opening accompanying insertion of the recording medium into the recording medium insertion opening.

According to still another feature of the present invention, there is provided a disk playback device equipped with a disk conveying device comprising a plurality of drive pulleys conveying a recording medium by abutting an edge of the recording medium, a guide member, disposed facing the plurality of drive pulleys, supporting the edge of the recording medium wherein the recording medium is interposed between the guide member and the plurality of drive pulleys, and a drive member, disposed roughly co-planar with a conveyance plane of the recording medium conveyed by the plurality of drive pulleys, rotating the plurality of drive pulleys by abutting each of the plurality of drive pulleys.

A disk playback device of the present invention includes a pair of disk holders which supports an edge of a disk along an appropriate angular range. A connecting member, connecting the pair of disk holders toward the recessed end of the direction in which the disk is inserted into the disk holder. Additionally, the disk playback device of the present invention includes means for conveying, engaging with each of the pair of disk holders, thereby conveying the disk holders perpendicular to a recording surface of the disk.

The above, and other objects, features, and advantages of the present invention will become apparent from the following description read in conjunction with the accompanying drawings, in which like reference numerals designate the same elements.

BRIEF DESCRIPTION OF THE DRAWINGS

FIG. 15 is a side-view drawing of a disk lock mechanism in an unlocked state.

FIG. 16 is a front-view drawing of the disk lock mechanism of FIG. 15.

DETAILED DESCRIPTION OF THE INVENTION

Referring to the figures, the following is a description of an embodiment implementing the present invention.

Disk Holder

Figure 1:
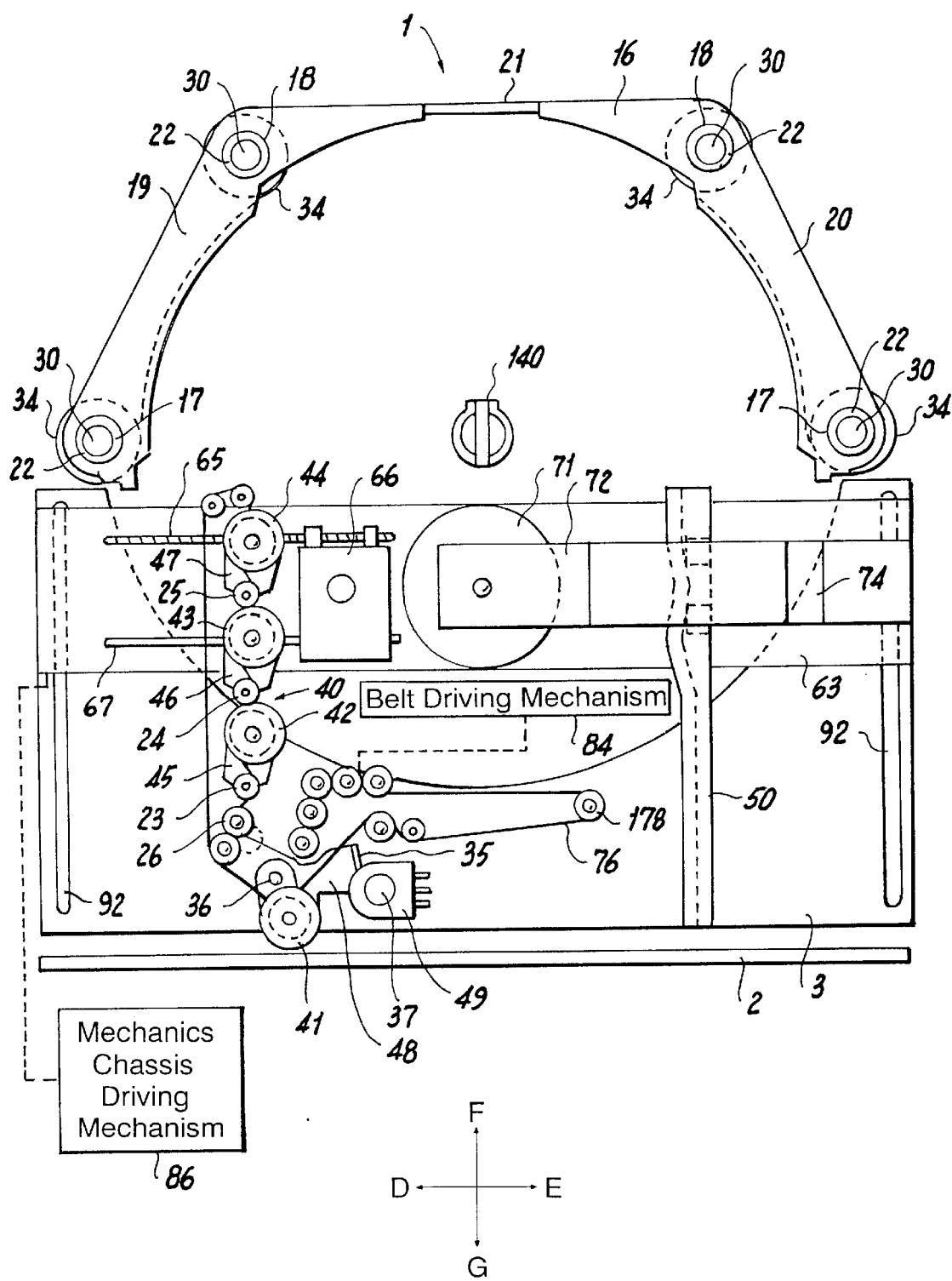
FIG. 1 is a schematic plan drawing of a disk playback device in a state where a disk can be loaded.

Referring to FIG. 1, a schematic plan drawing of a changer-type disk playback device 1, capable of holding six disks, is shown. FIG. 1 shows an initial state where no disks are stored. Toward the rear of device 1, disk holders 11–16 (only uppermost disk holder 16 is shown) are stacked to support the edges of 12 cm disks. The support on disks provided by disk holders 11–16 is only applied to the edges of the disks. Thus, even if a disk is damaged due to contact with disk holders 11–16, the influence on the information recorded on the disk is minimized.

Figure 23:
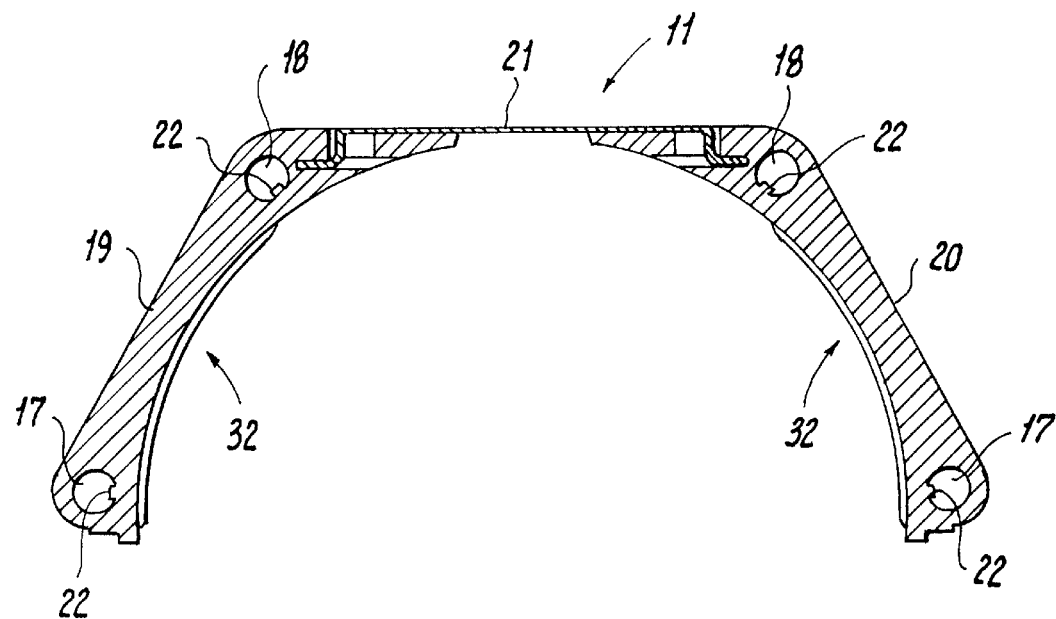
FIG. 23 is a cross-section drawing of a disk holder.

Referring to FIG. 23, there is shown a lateral cross-section drawing of disk holder 11. The following is a description of the structure of disk holder 11. Disk holder 11 is formed as a three-piece structure. Left and right holder plates 19 and 20 are molded from resin. A connecting bar 21 connects holder plates 19 and 20. Holder plates 19 and 20 are formed with disk supports 32, having square, C-shaped cross-sections and extending across a predetermined angular range. Disk supports 32 support the edge of a disk.

Holes 17 and 18 are on holder plates 19 and 20. Engagement pins 22 are projections inside holes 17 and 18. Referring back to FIG. 1, engagement pins 22 fit into cam grooves 33 on screw shafts 30, to be described later, in order to move disk holders 11–16 in the direction perpendicular to the plane of the drawing. If disk holder 11 thermally expands, holder plates 19 and 20 will expand longitudinally along the lines connecting holes 17 and 18. To absorb this expansion, hole 17 is formed as an oval, slightly larger along this longitudinal direction. Other disk holders 12–16 are formed with the same structure as disk holder 11.

The arrows F–G extend along the depth direction of disk playback device 1. In order to provide compactness in the F–G direction, it is important to reduce, as much as possible, the distance between the rearmost end of disk playback device 1 and the end of the disks supported by disk holders 11–16 in the direction of the arrow F. In this embodiment, connecting bar 21, which connects holder plates 19 and 20, can perform its function adequately with a diameter of about 1 mm. This contributes toward a reduced depth dimension for disk playback device 1. Also, since the support on the disks is divided up between holder plates 19 and 20, there is less deformation accompanying higher temperatures compared with an integral structure.

Screw Shaft

Figure 10:
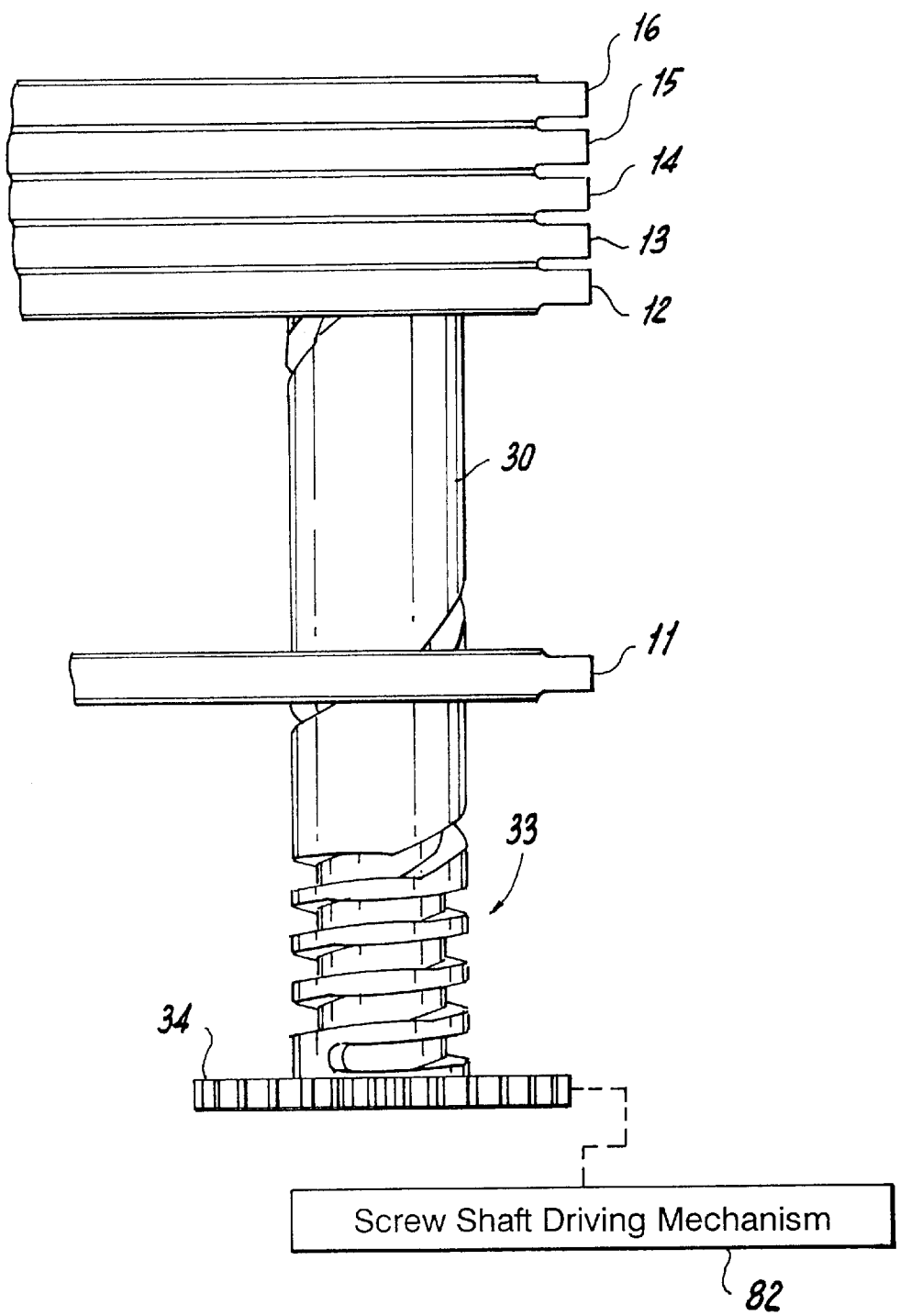
FIG. 10 is a side-view drawing of a screw shaft in a state where a disk holder 11 is selected.
Figure 11:
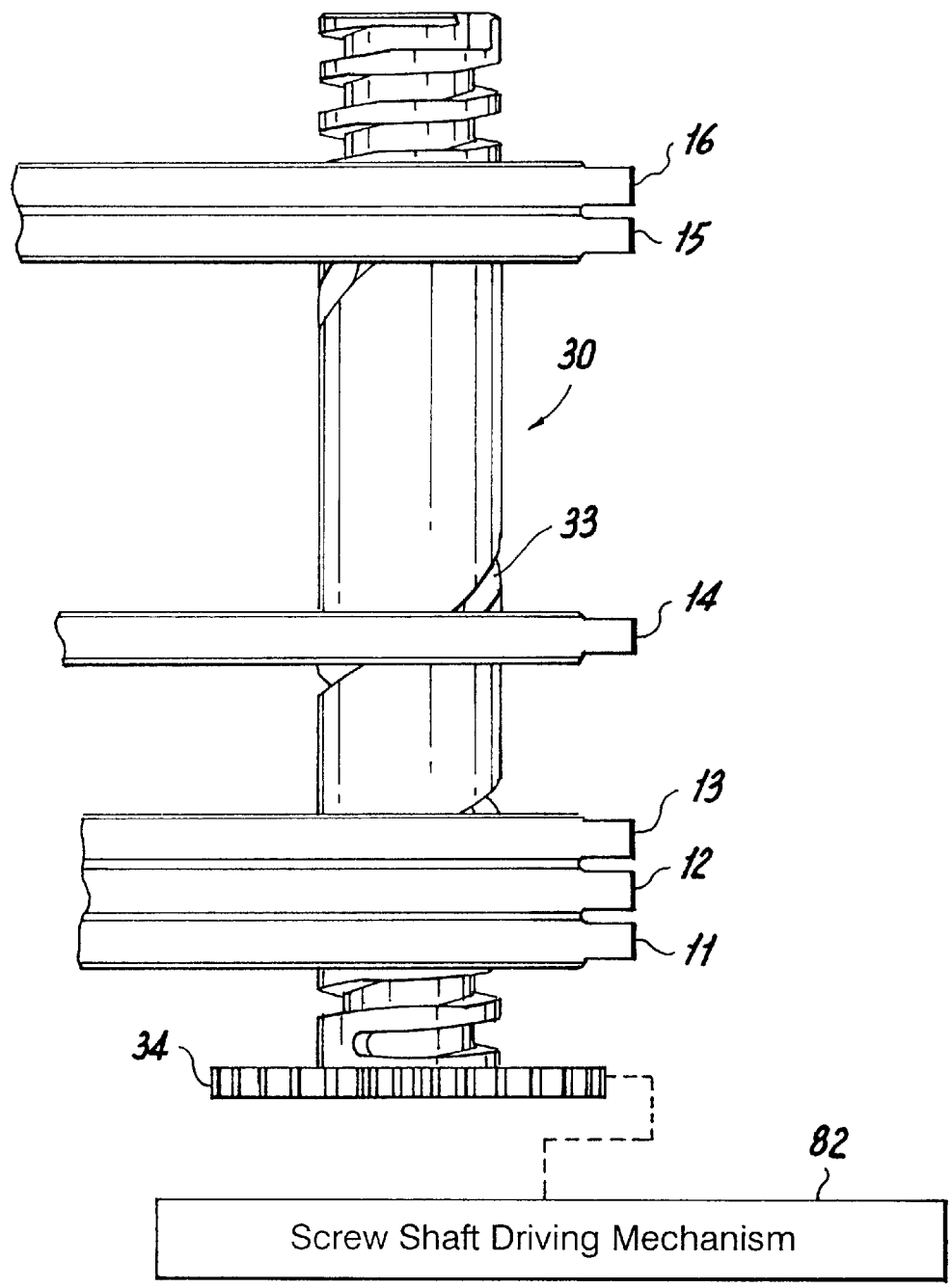
FIG. 11 is a side-view drawing of a screw shaft in a state where a disk holder 14 is selected.
Figure 12:
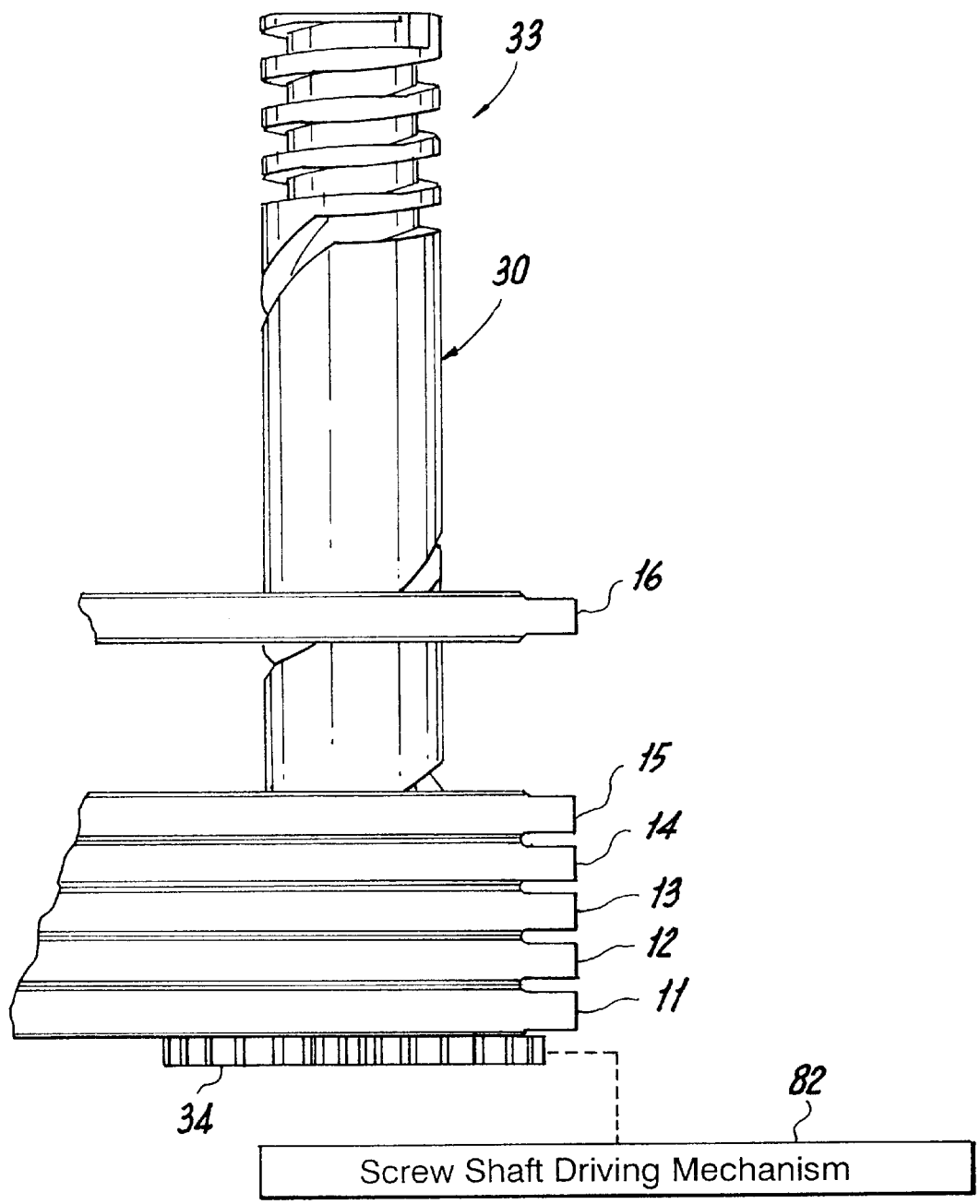
FIG. 12 is a side-view drawing of a screw shaft in a state where a disk holder 16 is selected.

Referring to FIGS. 10 through 12, there are shown side-view drawings of screw shaft 30. In FIG. 10, first disk holder 11 is selected. In FIG. 11, fourth disk holder 14 is selected. In FIG. 12, sixth disk holder 16 is selected. The surface of the cylindrical screw shaft 30 is formed with a single cam groove 33, into which engagement pin 22 is inserted. A spur gear 34 is formed on the bottom end of each of screw shafts 30 to mesh with an appropriate screw shaft drive mechanism 82, formed from a motor, a reduction gear mechanism, and the like. This structure controls the direction and position of the rotation of screw shaft 30. The four spur gears 34 are connected by a connecting mechanism, not shown in the drawings, so that they are rotated in the same direction and with the same rotation angle.

Disk Driving Mechanism

Referring again to FIG. 1, a disk driving mechanism 40, formed from a plurality of drive rollers or the like, is disposed on the left side, and a guide member 50 is disposed on the right side so that a disk can be supported between disk driving mechanism 40 and guide member 50. Disk driving mechanism 40 and guide member 50 serve as disk conveying means to convey a disk inserted from an opening (not shown in the figure) formed on a front panel 2 of device 1 to either a playback position or disk holders 11–16.

Disk driving mechanism 40 includes four drive rollers 41–44 disposed along the disk conveyance direction, each with grooves to support the edge of the disk with its perimeter surface. Drive roller 41 rotates around a shaft 36 and is rotatably supported on a roller support plate 48, which is pulled in a counter-clockwise direction. When a disk is inserted between drive roller 41 and guide member 50, roller support plate 48 rotates clockwise in opposition to the pulling force. A potentiometer 49 is disposed to detect this rotation position and the rotation speed. A gear (not shown in the figure) is disposed on a rotation shaft 37 of potentiometer 49. This gear meshes with a gear 35 formed on roller support plate 48.

Drive rollers 42–44 are rotatably supported by rotation shafts 23–25, respectively, and are rotatably supported on roller arms 45–47, which are pulled in the clockwise direction. A first timing belt 26, preferably having teeth on the inside, is used to drive drive rollers 42–44. Timing belt 26 extends across the following parts in the order shown: pulleys 171 and 172, drive roller 44, a pulley 29 attached co-axially with rotation shaft 25 of roller arm 47, drive roller 43, a pulley 28 attached co-axially with rotation shaft 24 of roller arm 46, drive roller 42, a pulley 27 attached co-axially with rotation shaft 23 of roller arm 45, a tension pulley 173 pivotable to the position indicated by the dotted lines in FIG. 1, a pulley 174 with a rotation axis that serves as the pivot axis for tension pulley 173, and pulley 171. Tension pulley 173 serves to keep the tension of timing belt 26 constant. Timing belt 26 is positioned along the same plane as the plane on which the disk driven by drive rollers 42–44 is conveyed.

Figure 24:
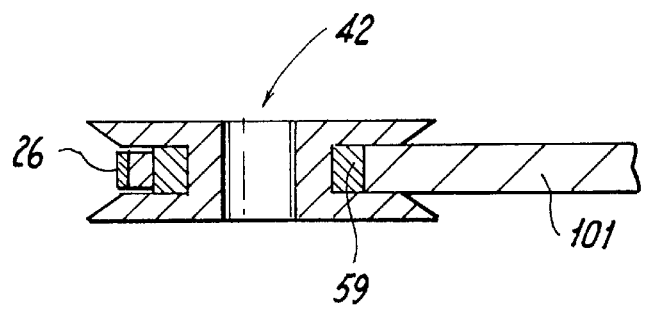
FIG. 24 is a cross-section drawing of a drive pulley.

Referring to FIG. 24, there is shown a cross-section drawing of drive roller 42 when a disk 101 is abutting drive roller 42. The outer perimeter of timing belt 26 abuts drive roller 42 at a section opposite from where drive roller 42 abuts the disk. This causes drive roller 42 to rotate. With this structure, there is no need to provide a gear or the like to drive roller 42 on a plane different from the plane at which drive roller 42 abuts disk 101. Thus, the height dimension of the disk driving mechanism 40 is reduced. A rubber ring 59 is disposed on drive pulleys 42–44 in order to improve the friction between disk 101 and timing belt 26.

Drive rollers 42–44, which convey the disk by pressing against the edge of the disk, are driven by first timing belt 26. A second timing belt 76, preferably having teeth on the inside, is disposed to drive drive roller 41 and timing belt 26.

Second timing belt 76 is disposed on a main chassis 4 and is rotated in both forward and reverse directions by a drive pulley 175. Drive pulley 175 is rotated by a belt driving mechanism 84 disposed on a main chassis 4 and formed from a motor, a reduction gear mechanism, and the like. Second timing belt 76 is wrapped around drive pulley 175 at a predetermined angle. Pulleys 176 and 177 are disposed on either side of drive pulley 175. Second timing belt 76 extends across drive pulley 175, pulleys 177, 178, 179 and 180, a pulley 181 attached co-axial to axis 36 of roller support plate 48, pulleys 174, 182, 183, 176, and back to drive pulley 175. Pulley 174 is formed from two co-axial pulleys, with first timing belt 26 and second timing belt 76 being disposed on different planes.

Guide member 50, formed with a square, C-shaped cross-section to support the edge of the disk, extends along the disk conveyance direction. Disk driving mechanism 40 and guide members 50 are displaced parallel to each other along the direction of the arrows, D–E in FIG. 1, due to a connecting mechanism, to be described later. When guide member 50 is moved an appropriate distance in the direction of arrow E, disk driving mechanism 40 moves the same distance in the direction of arrow D.

Figure 13:
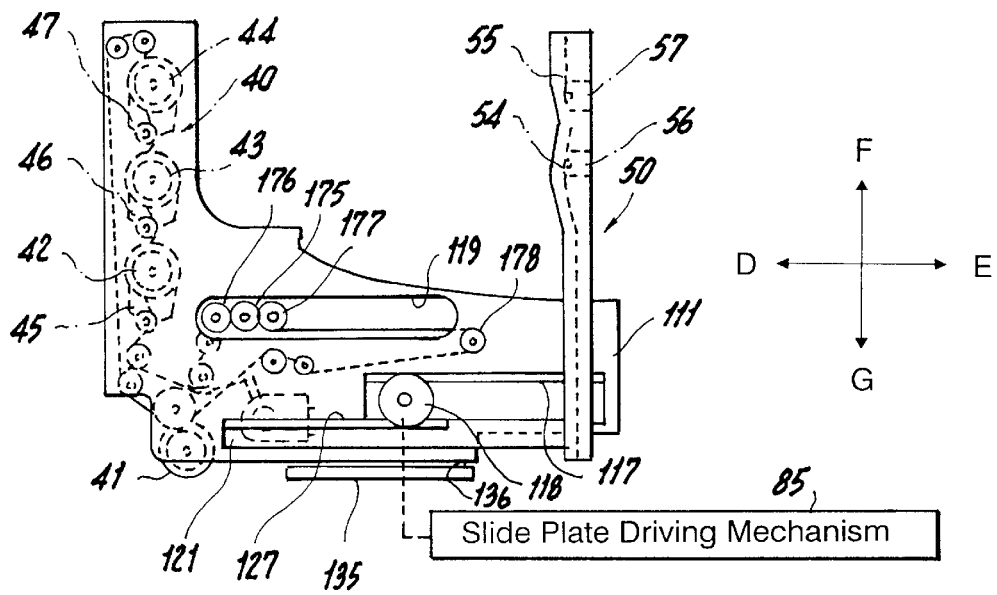
FIG. 13 is a schematic plan drawing for the purpose of describing the structure of slide plates according to the present invention.

Referring to FIG. 13, projections 54 and 55 are formed at positions equidistant from the contact point between guide member 50 and the disk when the disk has been brought to the playback position. Drive rollers 43 and 44 are also positioned in a similar manner equidistant from this playback position. Thus, when the disk is at the playback position, it is supported in a stable manner by projections 54 and 55 and driver rollers 43 and 44. The actuators of detector switches 56 and 57 project at the ends of projections 54 and 55 in order to detect when the disk has been brought to the playback position.

A linking mechanism allows disk driving mechanism 40 and guide member 50 to move along the direction of the D–E arrows. The figure shows the standby state from FIG. 1.

Figure 14:
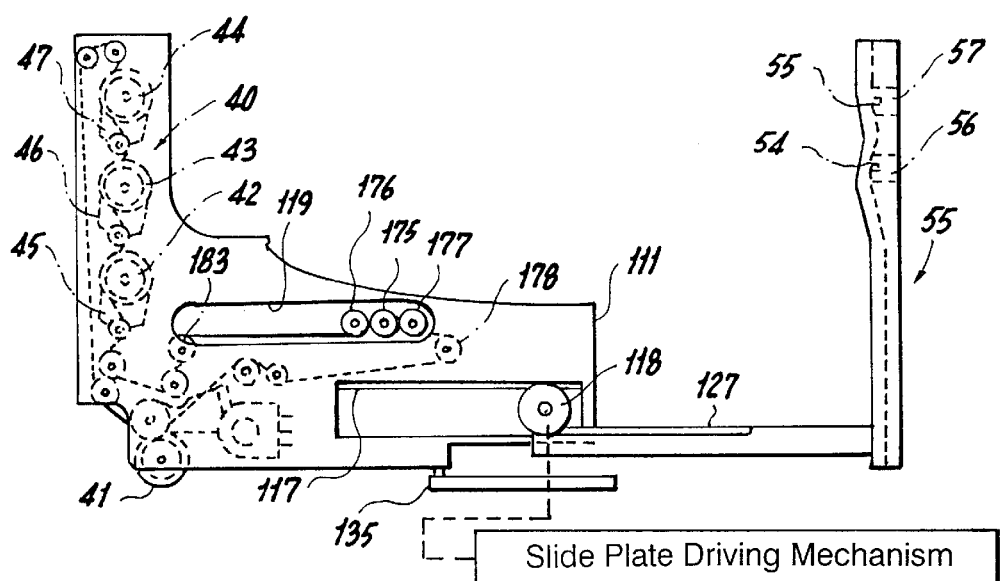
FIG. 14 is a schematic plan drawing for the purpose of describing the structure of slide plates according to the present invention.

Referring to FIG. 14, there is shown a plan drawing of the linking mechanism connecting disk drive mechanism 40 and guide member 50 in the playback state.

A first slide plate 111 is guided to allow parallel displacement relative to main chassis 4 along the D–E arrows. First slide plate 111 supports roller arms 45–47, which rotatably support drive rollers 42–44, roller support plate 48, and pulleys 171–174, across which first timing belt 26 extends. First slide plate 111 also supports pulleys 178–180, 182 and 183, across which second timing belt 76 extends. First slide plate 111 has a rack 117 meshing with a pinion gear 118, which is rotated by a slide plate driving mechanism 85 formed from a motor, a reduction gear, and the like.

A second slide plate 121 supports a guide member 50 and is guided to allow parallel movement relative to main chassis 4 along the D–E arrows. Second slide plate 121 has a rack 127 meshing with a pinion gear 118. When slide plate driving mechanism 85 rotates pinion gear 118 counter-clockwise, disk driving mechanism 40, supported by the slide plate 111, moves in the direction of the arrow D. Meanwhile, guide member 50, supported by slide plate 121, moves in the direction of the arrow E.

Drive pulley 175 and pulleys 176 and 177, which are adjacent to drive pulley 175, are supported by main chassis 4 so that they are unaffected by the movement of first slide plate 111. Pulleys 175–177 are positioned to be at the same height as the other pulleys through an opening 119 formed on first slide plate 111. Thus, if first slide plate 111, which supports drive rollers 41–44 serving as the driven members, is moved in the direction of the arrows D–E, drive pulley 175 will move in the direction of the arrows D–E between pulley 178 and pulley 183. Thus, a drive source for driving the driven member disposed on the movable member is disposed on the fixed member.

By detecting the position of first slide plate 111, the diameter of the disk being loaded is determined. To achieve this, a slide volume 135 is disposed on main chassis 4, and an actuator 136 is attached to first slide plate 111.

Figure 4:
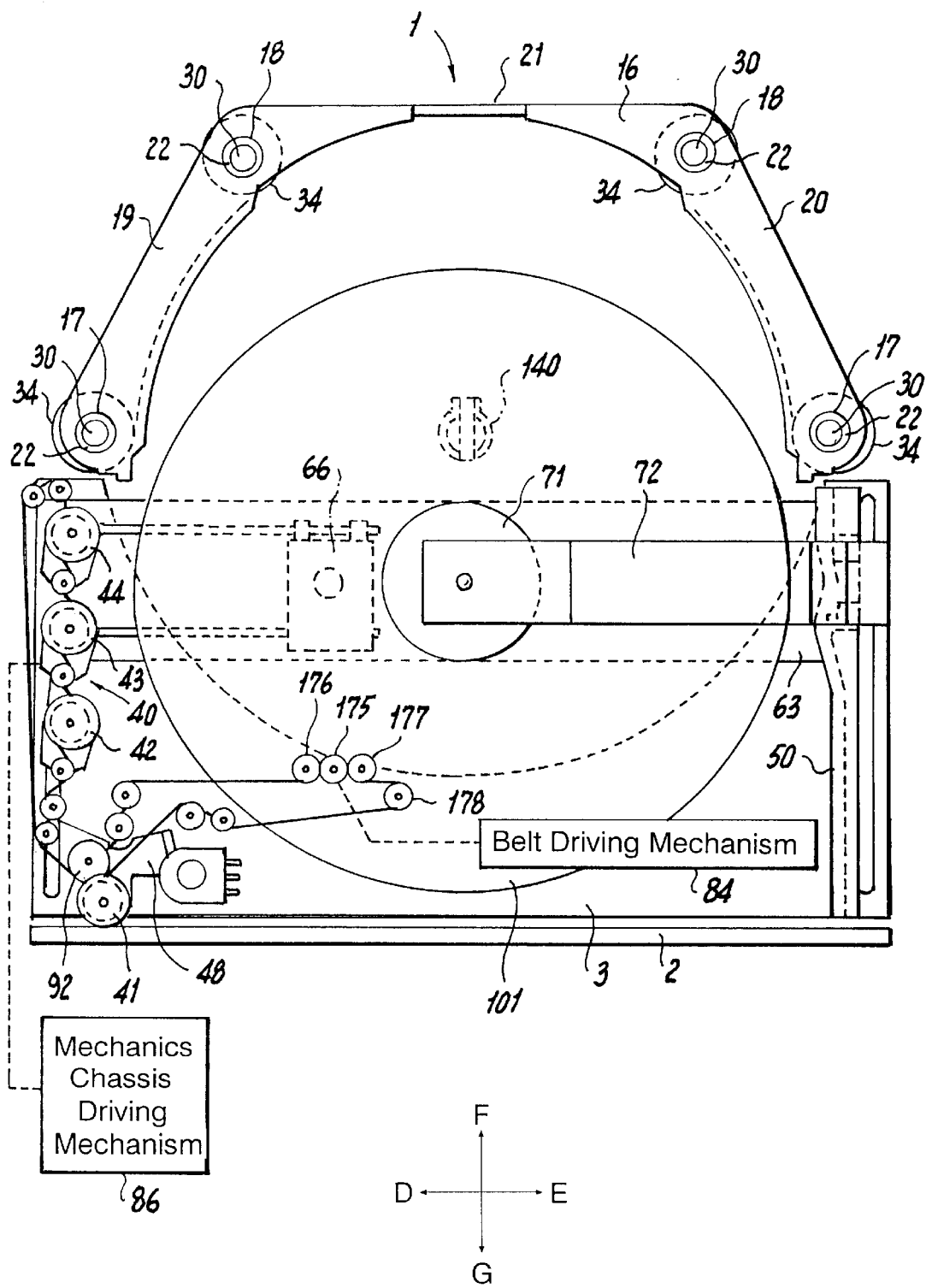
FIG. 4 is a schematic plan drawing of a disk playback device in a disk playback state.

Slide volume 135 detects the following positions: the position of first slide plate 111 in the standby state, allowing disk loading, as shown in FIG. 1, where the distance between disk driving mechanism 40 and guide member 50 is no more than the diameter of an 8 cm disk; the position of first slide plate 111 when an 8 cm disk is completely supported between disk driving mechanism 40 and guide member 50; and the position of first slide plate 111, as shown in FIG. 4, where disk driving mechanism 40 and guide member 50 are moved away from disk 101.

Disk Playback Mechanism

Figure 7:
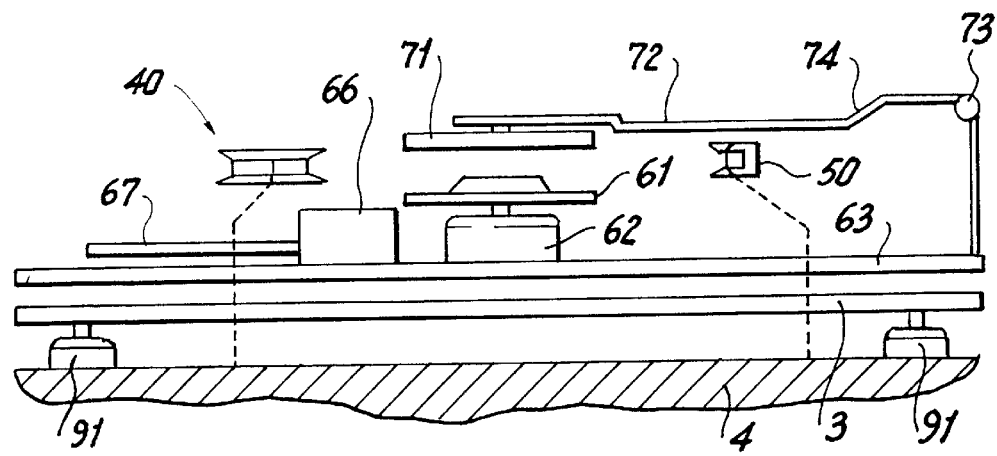
FIG. 7 is a front-view drawing of the disk playback device of FIG. 1.

Referring to FIG. 7, there is shown a front-view drawing corresponding to FIG. 1. A spindle motor 62, disposed on a mechanics chassis 63, rotates a turntable 61 on which a disk is mounted. A damper 71 is rotatably supported by a clamper arm 72 so that it can clamp a disk onto turntable 61. Clamper arm 72 is pivotably supported to mechanics chassis 63 by a shaft 73. Clamper 71 can move toward and away from turntable 61. Clamper arm 72 has a bend 74.

Figure 9:
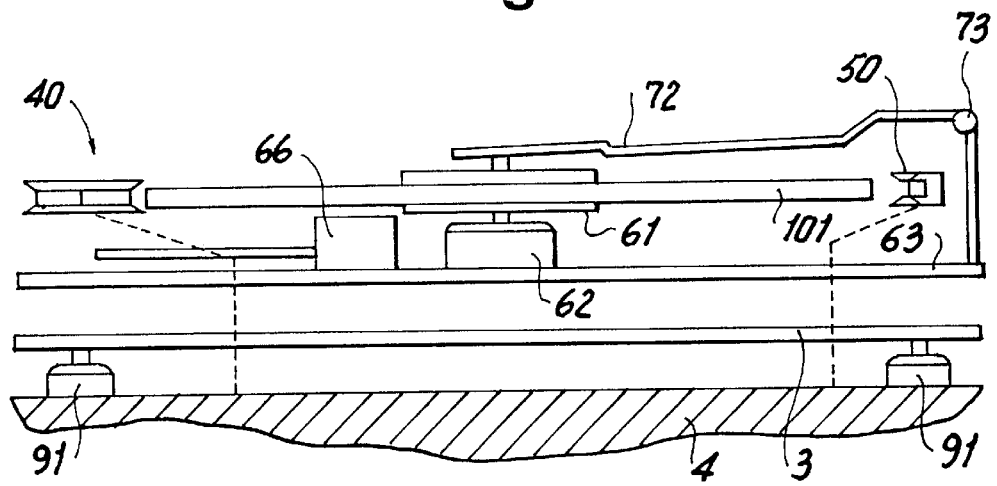
FIG. 9 is a front-view drawing of the disk playback device of FIG. 4.

Referring to FIG. 9, when guide member 50 is moved to a position away from the disk to allow the disk to be played back, an adequate distance is formed between guide member 50 and damper arm 72.

A feed screw 65 is rotated by an appropriate motor (not shown in the figure). An optical pickup 66 is disposed on mechanics chassis 63 so that it can move along the radius of the disk when feed screw 65 rotates. Information recorded on the disk is played back by applying a laser from optical pickup 66 to the disk while rotating the disk using spindle motor 62, and then reading the reflected light. Playback means is formed from at least turntable 61 and optical pickup 66.

A guide rail 67 is disposed on mechanics chassis 63 so that optical pickup 66 is guided to move along the direction of the D–E arrows shown in FIG. 1. Mechanics chassis 63 moves along a guide groove 92, disposed on base chassis 3, in the direction of the F–G arrows shown in FIG. 1 by a mechanics chassis driving mechanism 86 formed from a motor and the like. For clamp operations, mechanics chassis 63 can also move perpendicular to the disk recording surface. In these clamp operations, when mechanics chassis 63 is moving toward the recording surface of the disk, a connecting mechanism (not shown in the figure) causes clamper arm 72 to pivot around shaft 73 so that it approaches turntable 61. Thus, when the disk is being played back, the disk rotates on the same plane as the plane along which it is conveyed by disk driving mechanism 40.

Base chassis 3 is elastically supported by main chassis 4 by a damper 91. Disk driving mechanism 40 and guide member 50 are movably supported on main chassis 4. Screw shaft 30, supporting disk holders 11–16 so that they can move vertically, is rotatably supported on main chassis 4. Thus, disk holders 11–16 and disk conveying means, formed from disk driving mechanism 40, and guide member 50, are supported in device 1 without the involvement of damper 91.

Disk Locking Mechanism

Figure 17:
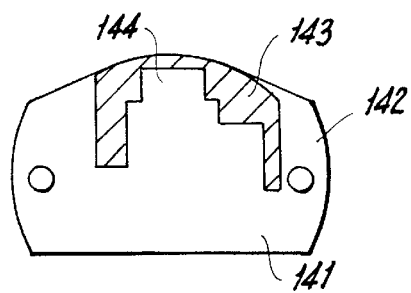
FIG. 17 is a cross-section drawing along the H—H line of FIG. 15.
Figure 18:
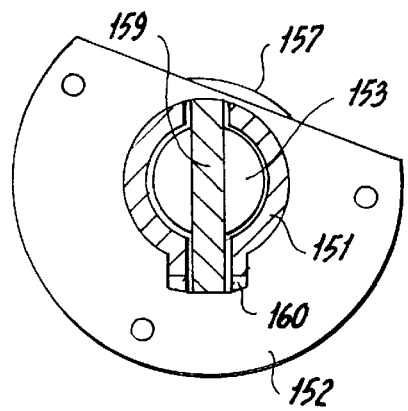
FIG. 18 is a cross-section drawing along the J—J line of FIG. 15.
Figure 19:
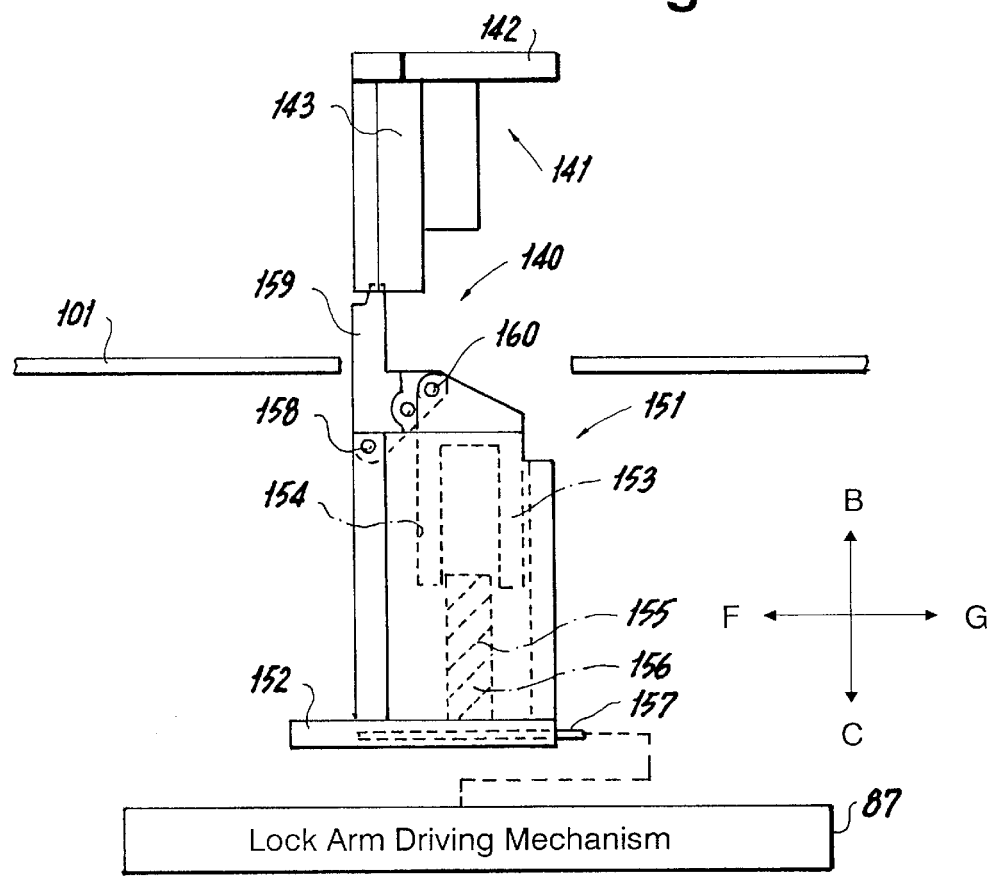
FIG. 19 is a side-view drawing of a disk lock mechanism in a locked state.
Figure 20:
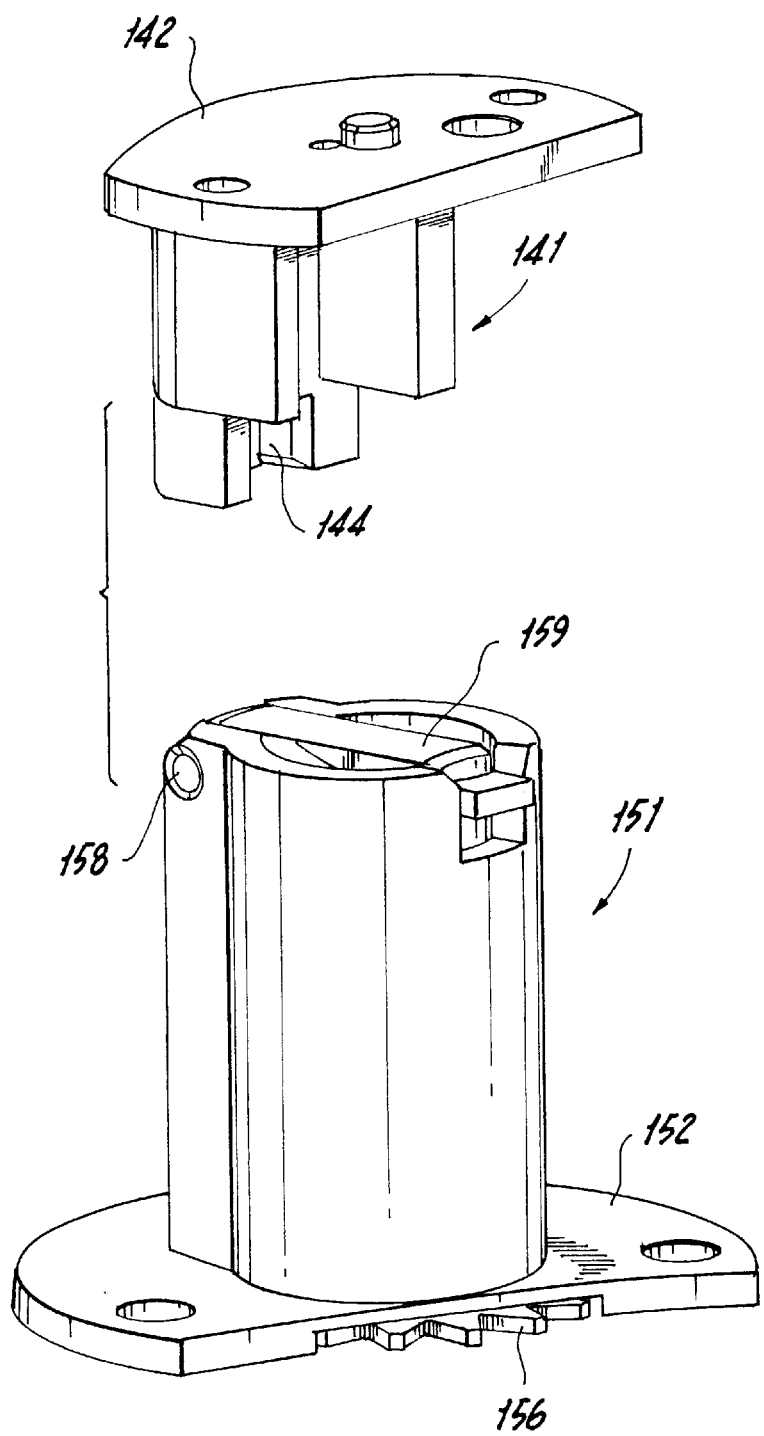
FIG. 20 is a perspective drawing of a disk lock mechanism in an unlocked state.
Figure 21:
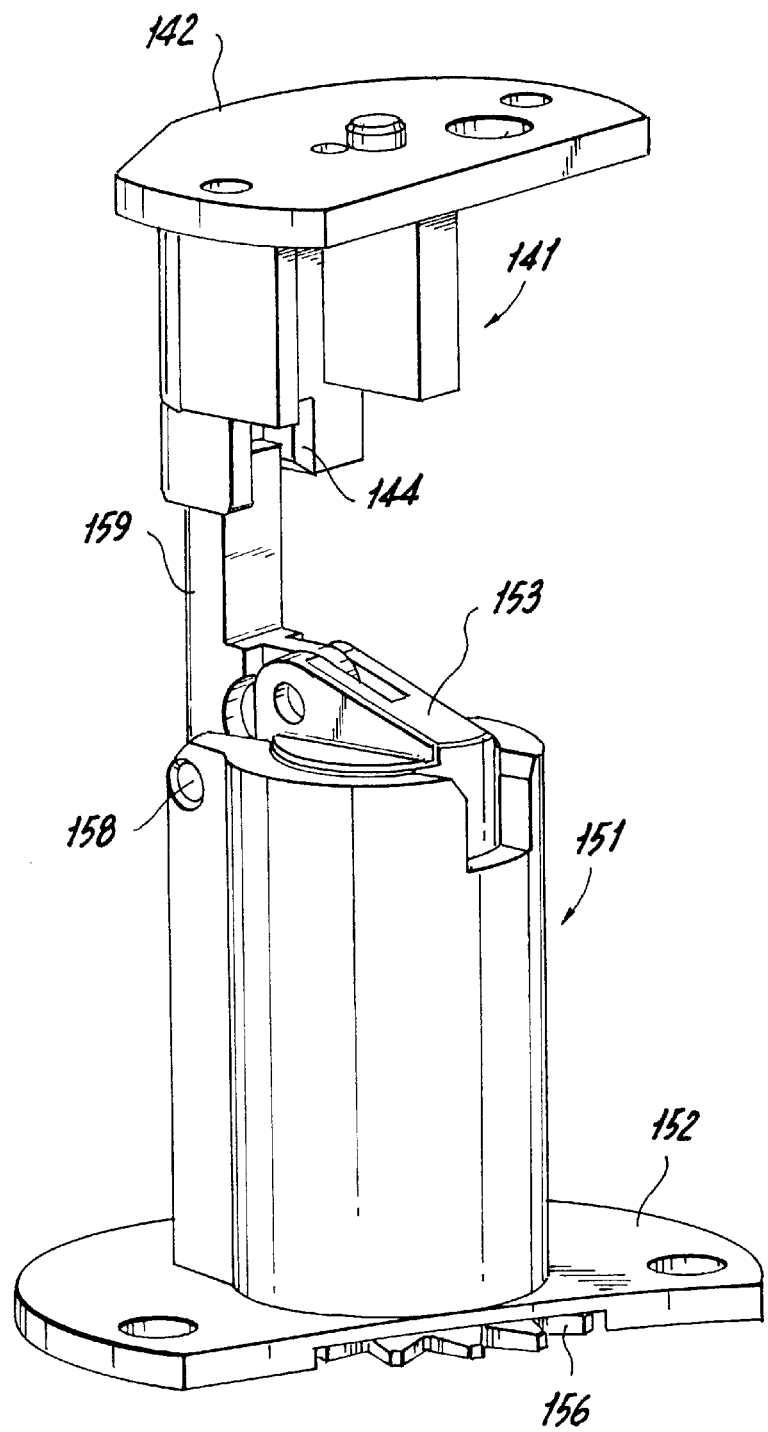
FIG. 21 is a perspective drawing of a disk lock mechanism in a locked state.

Referring again to FIGS. 1 and 15–21, in order to prevent the disks held in disk holders 11–16 from coming out in the direction of the arrow G, a disk locking mechanism 140, inserted into the center openings of the disks, is disposed on main chassis 4. Disk locking mechanism 140 will be described below. The unlocked state is shown in FIG. 15 and FIG. 16, which are a side-view drawing and a front-view drawing, as well as FIG. 17 and FIG. 18, which are a cross-section drawing along the H—H line and a cross-section drawing along the J—J line. The locked state is shown in FIG. 19, which is a side-view drawing. And the unlocked and locked states are shown in FIG. 20 and FIG. 21, which are perspective drawings.

An upper lock bracket 141, disposed above the disk conveyance plane, is formed from an attachment section 142 used for attachment to a chassis (not shown in the figure) and a disk lock section 143. A cavity 144 is formed on disk lock section 143 to receive a locking arm, to be described later.

A lower lock bracket 151, disposed below the disk conveyance plane, is formed in a roughly cylindrical shape, within which a disk lock nut 153 is disposed so that it can move along the direction indicated by the arrows B–C. A cylindrical hole 154 is at the center section of disk lock nut 153. A helical ridge projection (not shown in the figure) is on the surface of hole 154. A cam shaft 156 has a cavity groove 155 on the surface thereof in order to engage with the projecting ridge and move disk lock nut 153 vertically. A spur gear 157 is on the lower section of cam shaft 156. Spur gear 157 is exposed by cutting away a section of attachment section 152 of lower lock bracket 151.

A disk lock arm 159 is pivotally supported by a shaft 158 above lower lock bracket 151. Disk lock arm 159 connects to disk lock nut 153 by a pin 160.

Referring to FIG. 16, shaft 158 is parallel to the arrows D–E, i.e., the conveyance plane of disk 101, and is oriented perpendicular to the conveyance direction of disk 101 within device 1.

When spur gear 157 rotates clockwise by a lock arm driving mechanism 87 formed from a motor, a reduction gear, and the like, the engagement between cavity groove 155, formed on cam shaft 156, and the projecting ridge of disk lock nut 153 move disk lock nut 153 in the direction of the arrow B.

Referring to FIG. 15, this movement causes disk lock arm 159 to pivot 90 degrees counter-clockwise around shaft 158, closing the gap formed at the disk conveyance plane between upper lock bracket 141 and lower lock bracket 151. Upper lock bracket 141 is inserted into the center openings of the disks positioned above the disk aligned with the disk conveyance plane, while lower lock bracket 151 is inserted in the center openings of the lower disks, thus preventing the disks held in disk holders 11–16 from coming out.

Circuit Structure

Figure 22:
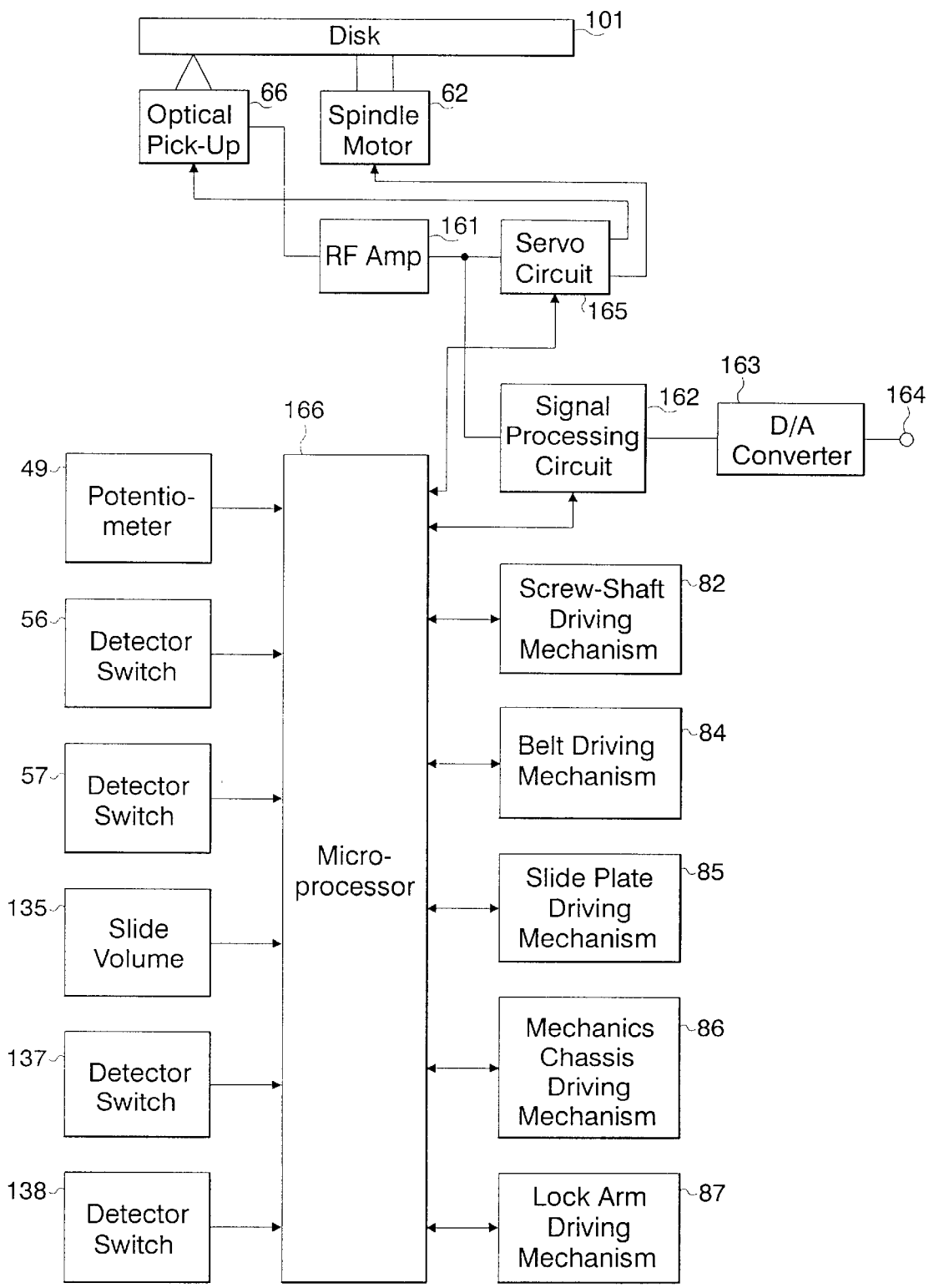
FIG. 22 is a schematic circuit drawing of a disk playback device according to the present invention.

Referring to FIG. 22, there is shown a circuit diagram of the main elements in device 1. Using optical pickup 66, a laser is applied to disk 101, rotates at a predetermined speed by spindle motor 62. A playback signal obtained from the reflected light is amplified by an RF amp 161 and is then sent to a signal processing circuit 162. Signal processing circuit 162 performs appropriate signal processing on the playback signal, such as demodulation and error correction. The signal is then converted to an analog signal by a D/A converter 163 and is output from an output terminal 164.

The playback signal is sent to a servo circuit 165 so that focus servo and tracking servo operations are performed on optical pickup 66 and so that spindle motor 62 rotates at an appropriate speed.

A microprocessor 166, controlling operations of device 1, controls signal processing circuit 162 and servo circuit 165. Microprocessor 166 also controls the various operations of screw shaft driving mechanism 82, belt driving mechanism 84, slide plate driving mechanism 85, mechanics chassis driving mechanism 86, and lock arm driving mechanism 87, described above.

Description of Operations

The following is a description of the operations performed in the structure described above when disk 101 having a 12 cm diameter is inserted into device 1.

Referring to FIGS. 1, 7, 13, in the loading standby state where a disk can be inserted, the distance between guide member 50 and first driving roller 41 closest to front panel 2 is set to be slightly smaller than the diameter of an 8 cm disk.

Referring to FIG. 10, in this standby state disk holder 11 is aligned with the disk conveyance plane. Disk 101 is inserted through the opening (not shown in the figure) formed on front panel 2.

Figure 2:
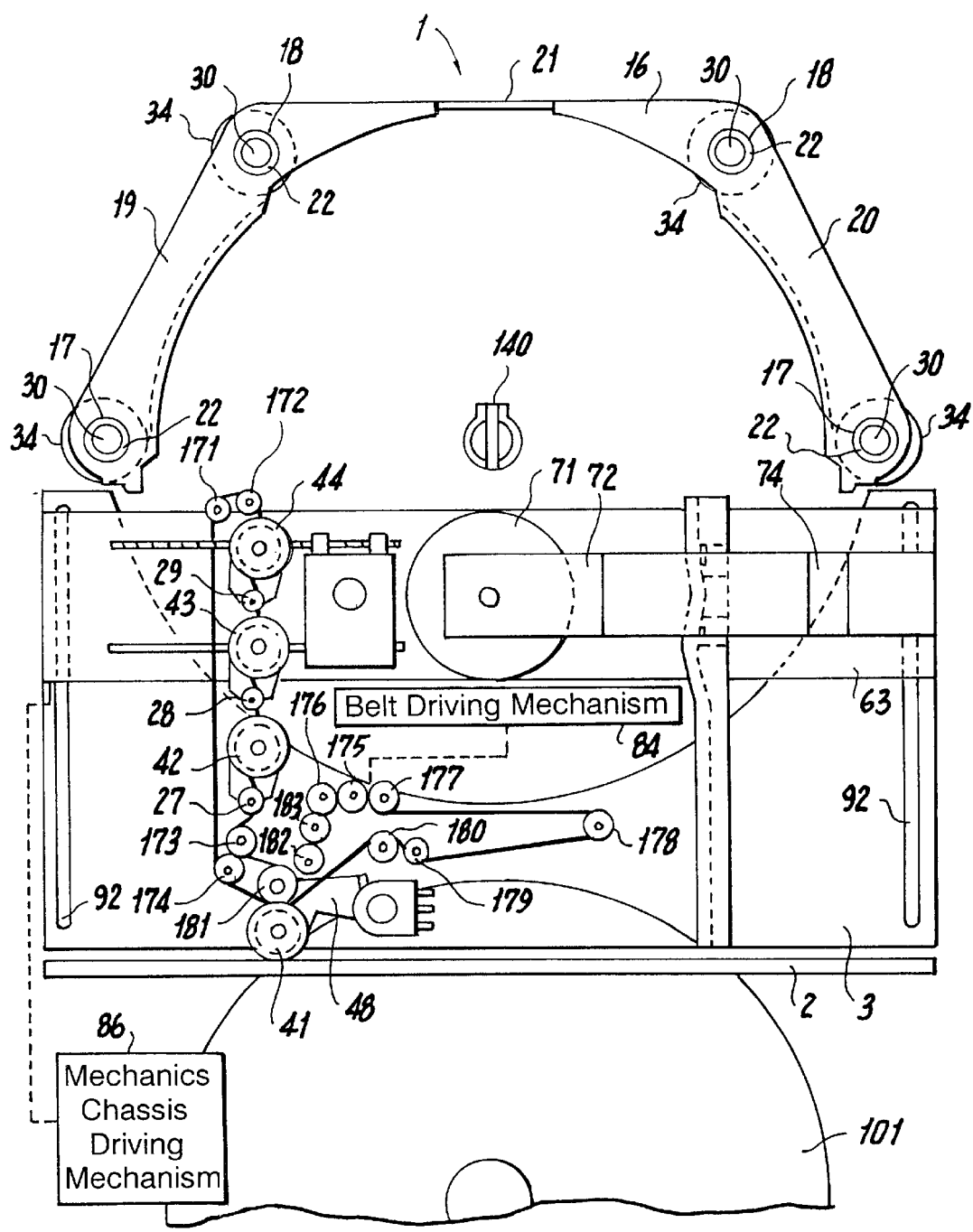
FIG. 2 is a schematic plan drawing of a disk playback device in a state where a disk is inserted.
Figure 3:
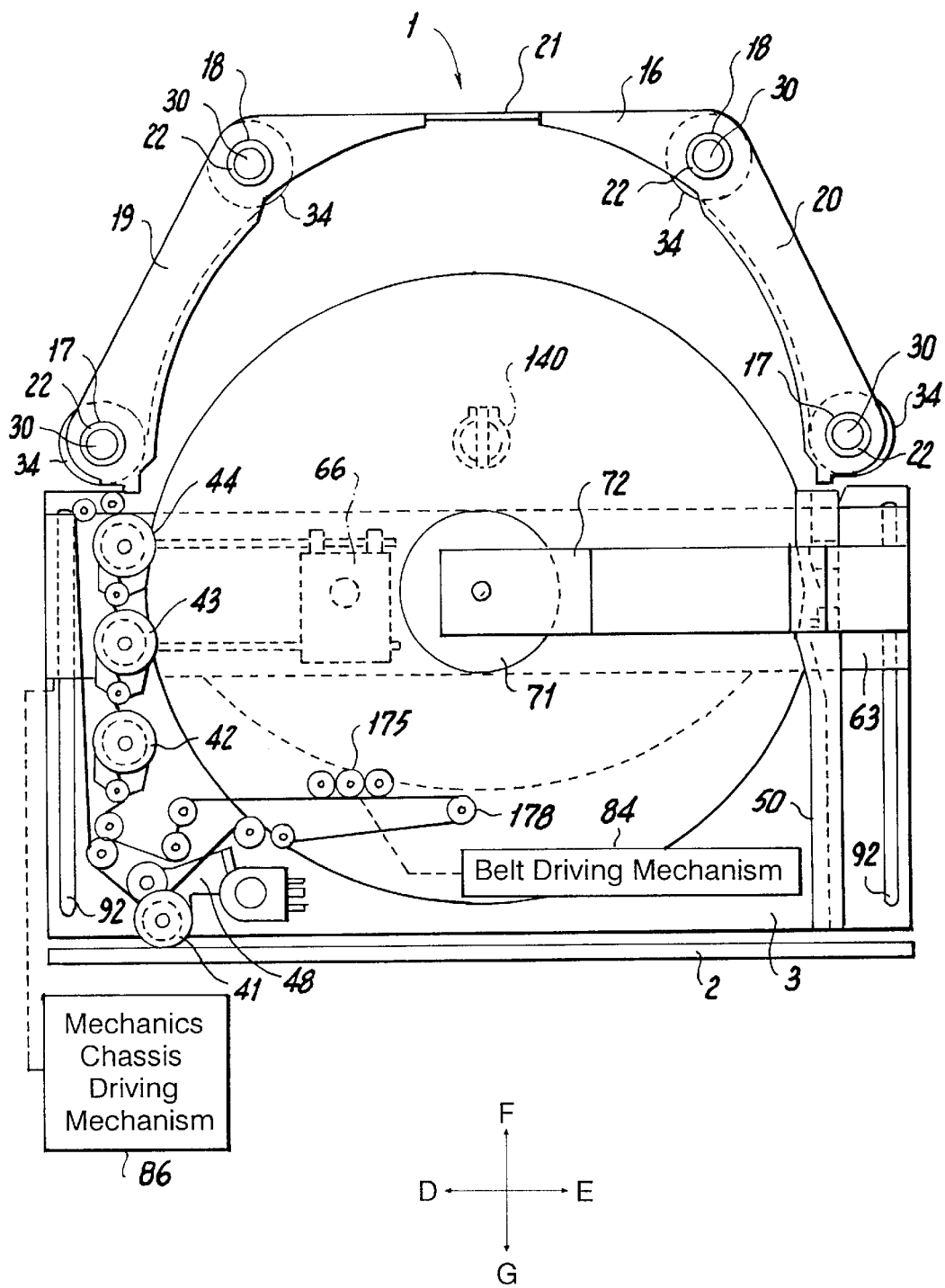
FIG. 3 is a schematic plan drawing of a disk playback device in a state where a disk has been brought to a playback position.

Referring to FIG. 2, disk 101 causes support plate 48, supporting drive roller 41, to pivot clockwise around shaft 36, moving against the pulling force on support plate 48. This causes gear 35 of support plate 48 to rotate rotation shaft 37 of potentiometer 49. This is accompanied by a change in the resistance of potentiometer 49, allowing device 1 to detect that disk 101 is inserted.

When insertion of disk 101 is detected, belt driving mechanism 84 rotates drive pulley 175 clockwise. As a result, drive belt 76 rotates connected pulleys 178, 179, 181, 174 and 183 clockwise and pulleys 177, 180, 182 and 176 counter-clockwise. Thus, drive roller 41, which meshes with pulley 181, rotates counter-clockwise.

The clockwise rotation of pulley 174 causes drive belt 26 to rotate connected pulleys 171, 172, 29, 28 and 27 clockwise and drive rollers 42–44, and pulley 173 counter-clockwise. The counter-clockwise rotation of drive rollers 41–44 causes disk 101, supported between the rollers and guide member 50, to be conveyed in the direction of the arrow F.

Referring to FIG. 13, slide plate driving mechanism 85 rotates pinion gear 118 counter-clockwise based on instructions from microprocessor 166. As a result, first slide plate 111 moves in the direction of the arrow D and second slide plate 121 moves in the direction of the arrow E while staying parallel to each other.

Potentiometer 49 detects movement of drive roller 41 in order to detect insertion of disk 101. Thus, if a disk inserted into device 1 is off-center to the right and does not abut drive roller 41, slide plate driving mechanism 85 will not activate. To eliminate this problem, it is possible to provide a detector switch or the like, on guide member 50, in order to detect contact with disk 101. The two detection elements could then work together for the control operations of slide plate driving mechanism 85.

Slide plate driving mechanism 85 moves first slide plate 111 and second slide plate 121 away from each other. This causes roller support plate 48, which was pivoted clockwise by disk 101, to rotate counter-clockwise. When this change in the opposite direction is detected by potentiometer 49, slide plate driving mechanism 85 rotates pinion gear 118 clockwise so that first slide plate 111 and second slide plate 121 move toward disk 101.

With these control operations, when disk 101 is inserted into device 1, disk driving mechanism 40 and guide member 50 move away from each other by slide plate driving mechanism 85. Thus, it is not the user's disk insertion force that moves disk driving mechanism 40 and guide member 50 apart. Instead, control operations are performed so that disk driving mechanism 40 and guide member 50 move away from each other when a disk is inserted into device 1. Thus, a disk can be loaded with little insertion force.

Furthermore, when disk 101 is inserted, disk 101 will be completely inserted between disk driving mechanism 40 and guide member 50 so that the positions of first and second slide plates 111 and 121 stay fixed. By detecting the position of slide plate 111 using slide volume 135, microprocessor 166 recognizes the inserted disk 101 as a 12 cm disk. Then, slide plate driving mechanism 85 rotates pinion gear 118 clockwise so that, during disk loading, disk 101 is conveyed in the direction of the arrow F while disk 101 is supported in a stable manner with a predetermined supporting pressure between disk driving mechanism 40 and guide member 50.

During this loading operation, disk 101 passes driving rollers 42 and 43 and is conveyed to the playback position. When passing these rollers, first and second slide plates 111 and 121 maintain their positions while roller arms 45 and 46, which support drive rollers 42 and 43 pivot counter-clockwise against pulling forces. When roller arms 45 and 46 pivot, tension pulley 173 pivots clockwise around the rotation axis of pulley 174, thus maintaining a fixed tension for timing belt 26.

Referring to FIG. 7, disk driving mechanism 40 and guide member 50 are movably supported on main chassis 4. Thus, when disk 101 is inserted, the user can obtain a hard insertion "feel" that is unaffected by damper 91.

The rotation of drive rollers 41–44 cause disk 101 to move in the direction of the arrow F toward the playback position. The actuators of detector switches 56 and 57 are pressed by the edge of disk 101, and disk 101 is conveyed to the playback position where both detector switches 56 and 57 are on. At this playback position, disk 101 is not in contact with disk holder 11, which is positioned at the same height.

Next, mechanics chassis driving mechanism 86 causes mechanics chassis 63 and damper 71 to approach each other toward disk 101. This causes disk 101 to be clamped between turntable 61 and damper 71.

Then, slide plate driving mechanism 85 moves disk driving mechanism 40 and guide member 50 in the direction of the arrow D and the arrow E respectively, thus causing them to move away from disk 101. Then, disk 101 rotates at an appropriate speed. This playback state is shown in FIG. 4 and FIG. 9, which is a front-view drawing thereof. This playback position is at the same height as the conveyance plane of disk 101.

Figure 8:
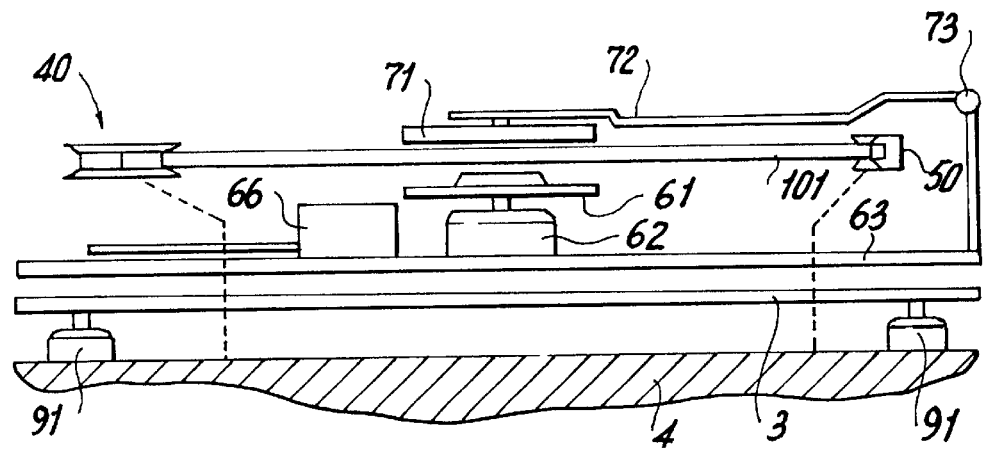
FIG. 8 is a front-view drawing of the disk playback device of FIG. 3.

Referring to FIG. 7, 8 and 9, clamp arm 72 is supported by mechanics chassis 63, which is supported on damper 91. Guide member 50 is supported on main chassis 4. In the playback state, vibration will cause clamp arm 72 to move, but adequate space is provided between clamp arm 72 and guide member 50. Thus, since clamp arm 72, past bend 74, can be close to disk 101, the height of the device is reduced.

The following is a description of how disk 101 is stored in disk holder 11 after playback of disk 101 is completed, and how a different disk is stored in fourth disk holder 14. After playback of disk 101 is completed, slide plate driving mechanism 85 moves disk driving mechanism 40 and guide member 50 in the direction of the arrow E and the arrow D respectively, thus placing disk 101 between drive rollers 43 and 44 and guide member 50. Then, mechanics chassis driving mechanism 86 moves mechanics chassis 63 and damper 71 away from each other and disk 101, thus releasing the clamped state of disk 101.

Then, roller driving mechanism 84 rotates drive rollers 41–44 counter-clockwise, thus moving disk 101 in the direction of the arrow F, and disk 101 is inserted into disk holder 11. Then, slide plate driving mechanism 85 moves disk driving mechanism 40 and guide member 50 away from each other.

Figure 5:
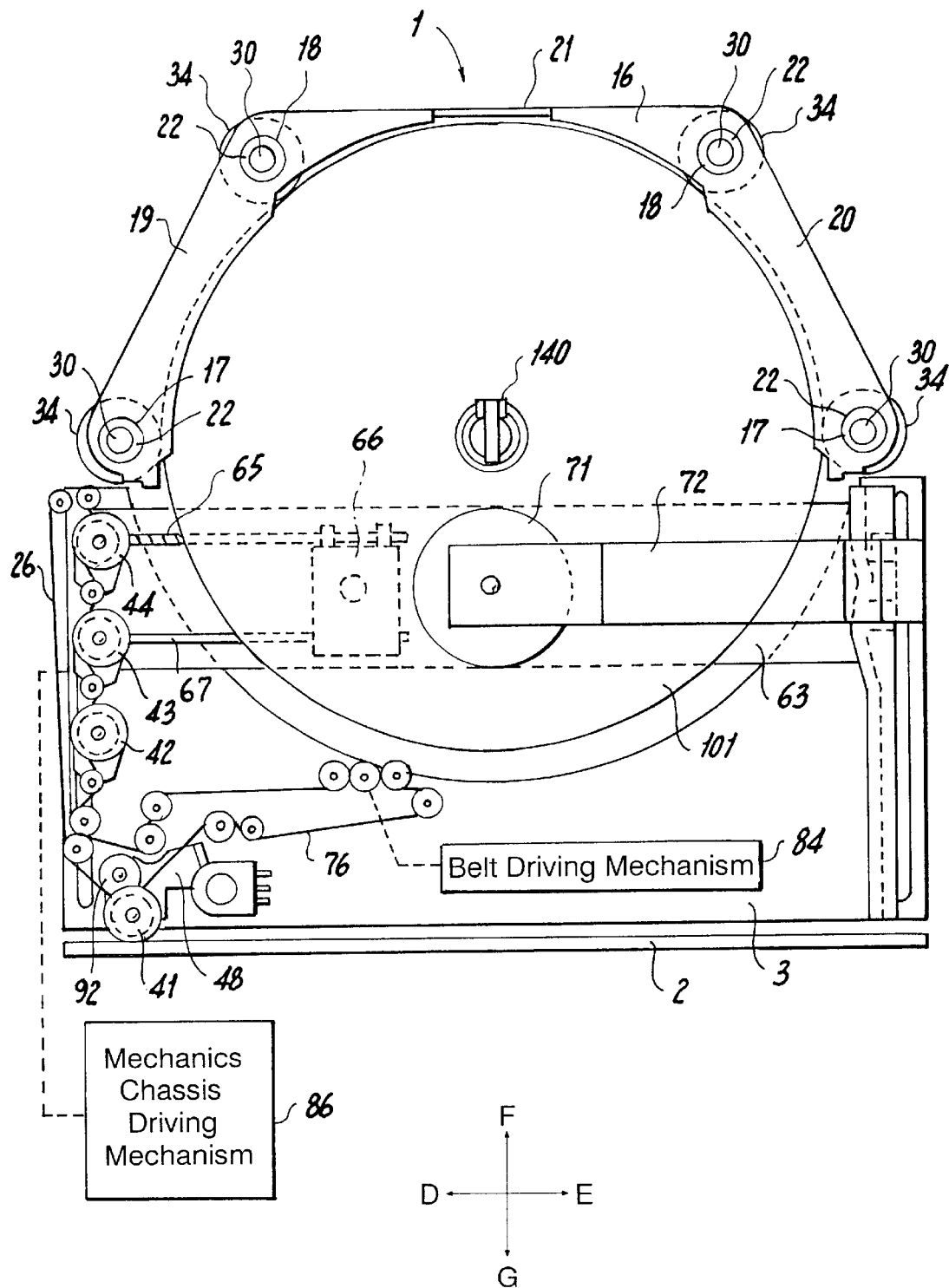
FIG. 5 is a schematic plan drawing of a disk playback device in a state where a disk has been brought to a holding position.

Referring to FIGS. 5 and 14, first and second slide plate 111 and 121 are moved to positions where drive roller 44 and guide member 50 are moved away from disk 101, as shown in the figures.

Referring to FIGS. 15 and 20, after disk 101 is stored in disk holder 11, lock arm driving mechanism 87 rotates spur gear 157 clockwise and moves disk lock nut 153, engaged with cam shaft 156, in the direction of the arrow B. This rotation causes disk lock arm 159 to pivot 90 degrees counter-clockwise around shaft 158. The end of disk lock arm 159 engages with cavity 144 formed on upper lock bracket 141 so that the disk conveyance plane is sealed. This causes disk lock arm 159 to be inserted through the center hole of disk 101, thus preventing disk 101 from coming out from disk holder 11. This locked state is shown in FIGS. 19 and 21.

Disk lock arm 159 pivots in the direction by which disk 101 is conveyed to disk holder 11. Thus, if disk driving mechanism 40 has not conveyed disk 101 completely to disk holder 11, disk lock arm 159 will press against the edge of the center hole of disk 101 to move disk 101, thereby allowing disk 101 to be stored reliably in disk holder 11.

Mechanism chassis driving mechanism 86 causes mechanism chassis 63 to move along guide groove 92 in the direction of the arrow G.

Figure 6:
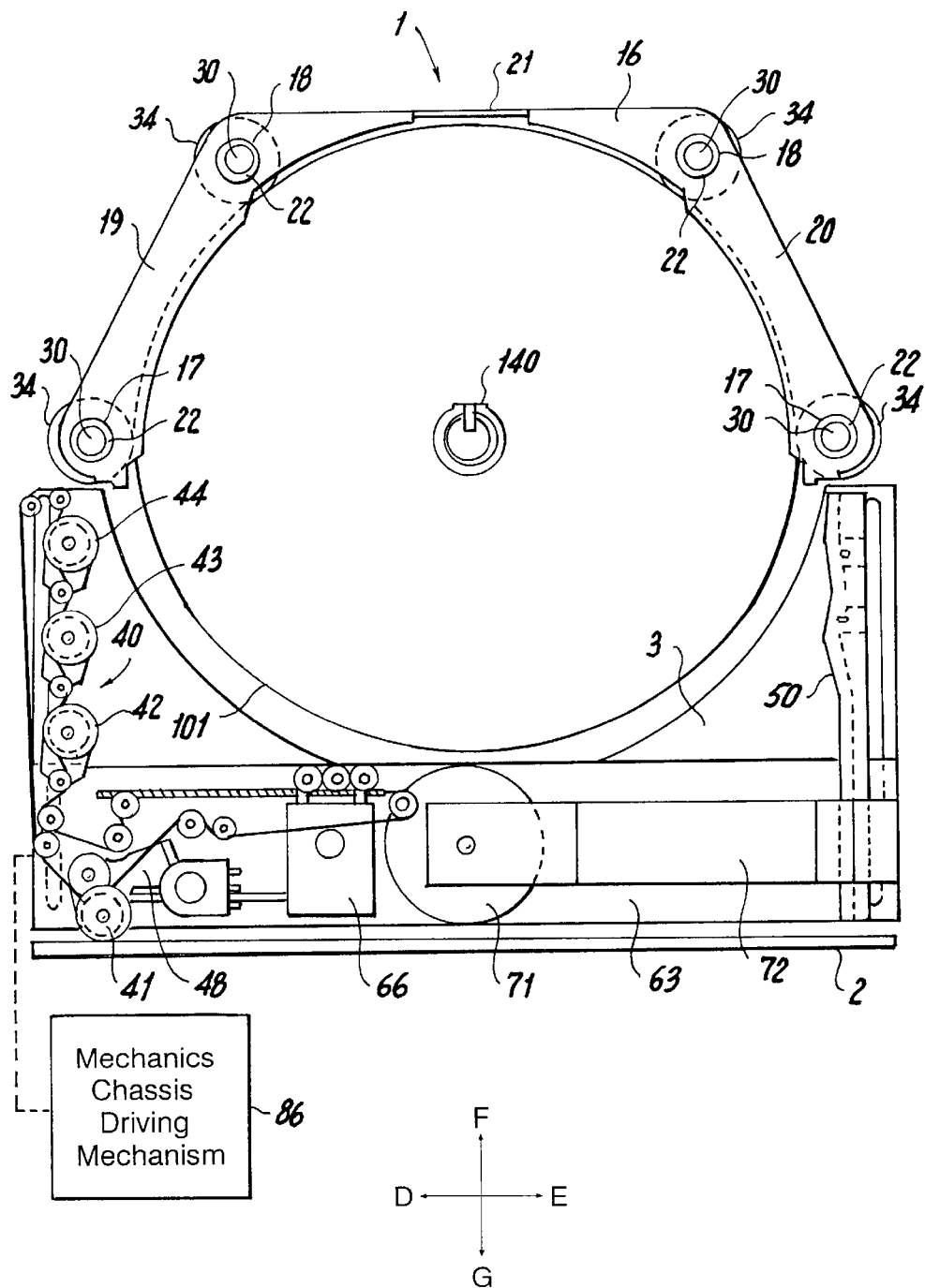
FIG. 6 is a schematic plan drawing of a disk playback device in a state where a disk can be selected.

Referring to FIG. 6, mechanism chassis 63 is brought to a standby position where there is no overlap with disk 101 being held in disk holder 1 1. Next, in order to select disk holder 14, screw shaft driving mechanism 82 rotates screw shaft 30 clockwise.

Referring to FIG. 11, screw shaft 30 rotates until disk holder 14 is aligned with the disk conveyance plane. Then, slide plate driving mechanism 85 moves first and second sliding plates 111 and 112.

Referring back to FIG. 1, disk driving mechanism 40 and guide member 50 move to the standby position where a disk can be inserted.

Referring to FIGS. 1 and 7, when an 8 cm disk is loaded from the loading standby position shown in the figures, the insertion of the 8 cm disk causes drive roller 41 to rotate clockwise. As described above, slide plate driving mechanism 85 moves first and second slide plates 111 and 121. Then, the 8 cm disk is supported completely between disk driving mechanism 40 and guide member 50, and slide volume 135 is kept at a fixed state for a predetermined time.

This static state of slide volume 135 allows the insertion of the 8 cm disk to be detected. After detection, slide plate mechanism 85 pulls first and second slide plates 111 and 121 so that they support the 8 cm disk. As with the case of the 12 cm disk, the loading operation for the 8 cm disk performed by drive rollers 41–44 is stopped when detector switches 56 and 57 are in the on state.

In this embodiment, disk holders 11–16 cannot hold 8 cm disks. Thus, when the loading of an 8 cm disk is detected, conveyance of the 8 cm disk from the playback position to the disk storing position is prohibited.

In the embodiment described above, a plurality of drive rollers is used as the disk conveyance mechanism. However, the present invention is not restricted to this, and it would be possible to us other driving means as appropriate, e.g., a pair of pinch rollers having rotation axes parallel to the main plane of the disk.

Advantages of the Invention

In the device according to the present invention as described above, a connecting member connects a pair of holder plates toward the end of the holder plates at the recessed end in the direction in which the disk is inserted. By forming the holding member holding disks using three pieces, there is less deformation causes by high temperatures compared to integrally formed units.

Also, since this connecting member only serves to connect the pair of holder plates, a thin rod-shaped connecting bar can be used. This allows the clearance between the disks held toward the back of the device and the rear panel to be minimized, thus contributing to a reduced depth dimension for the device.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disk playback device comprising:

first and second conveying means for conveying recording media and supporting said recording media from either side;

a disk insertion detection means for detecting an insertion of said recording media into a recording media insertion opening;

a driving mechanism, driving at least one of said first and second conveying means so that said first and second conveying means move away from each other when said disk insertion detection means detects the insertion of said recording media;

a position detecting means for detecting a distance between said first and second conveying means; and controlling means for controlling said driving mechanism in response to said position detecting means, whereby said first and second conveying means move to a fixed distance to convey said recording media from said recording media insertion opening to a predetermined position.

2. The disk playback device according to claim 1 wherein:

when said position detecting means detects that said first and second conveying means is supporting a maximum diameter of said recording media, said controlling means controls said driving mechanism to drive said first and second conveying means in a direction where said distance between said first and second conveying means is reduced.

* * * * *